(12) United States Patent
Deininger et al.

(10) Patent No.: US 10,704,566 B2
(45) Date of Patent: Jul. 7, 2020

(54) CONNECTOR UNIT FOR A FAN

(71) Applicant: ebm-papst Landshut GmbH, Landshut (DE)

(72) Inventors: Martin Deininger, Geisenhausen (DE); Martin Hertreiter, Loiching (DE); Frank Schlopakowski, Landshut (DE)

(73) Assignee: ebm-papst Landshut GmbH, Landshut (DE)

(*) Notice: Subject to any disclaimer, the term of this patent is extended or adjusted under 35 U.S.C. 154(b) by 0 days.

(21) Appl. No.: 15/902,126

(22) Filed: Feb. 22, 2018

(65) Prior Publication Data
US 2018/0238345 A1 Aug. 23, 2018

(30) Foreign Application Priority Data

Feb. 23, 2017 (DE) .................. 10 2017 103 774
Jul. 7, 2017 (DE) .................. 10 2017 115 214

(51) Int. Cl.
| | |
|---|---|
| *F04D 29/58* | (2006.01) |
| *F04D 29/02* | (2006.01) |
| *H02K 5/26* | (2006.01) |
| *F04D 29/42* | (2006.01) |
| *F04D 25/08* | (2006.01) |

(Continued)

(52) U.S. Cl.
CPC ......... *F04D 29/5813* (2013.01); *F04D 25/06* (2013.01); *F04D 25/0606* (2013.01); *F04D 25/08* (2013.01); *F04D 29/023* (2013.01); *F04D 29/281* (2013.01); *F04D 29/403* (2013.01); *F04D 29/4226* (2013.01); *F04D 29/662* (2013.01); *F04D 29/668* (2013.01); *H02K 1/2726* (2013.01); *H02K 1/2733* (2013.01); *H02K 1/28* (2013.01); *H02K 5/26* (2013.01);

(Continued)

(58) Field of Classification Search
CPC ... H02K 5/15; H02K 5/24; H02K 5/26; F04D 25/12; F04D 13/0626; F04D 29/60; F04D 29/40; F04D 29/403; F04D 29/4226; F04D 29/62
USPC .............................. 403/43, 73, 148, 163, 267
See application file for complete search history.

(56) References Cited

U.S. PATENT DOCUMENTS

| 2,881,995 A | 4/1959 | Neher |
|---|---|---|
| 4,964,609 A | 10/1990 | Tomell |

(Continued)

FOREIGN PATENT DOCUMENTS

| CA | 755962 A | 4/1967 |
|---|---|---|
| CA | 2483946 A1 | 9/2005 |

(Continued)

OTHER PUBLICATIONS

European Search Report dated Jul. 19, 2018 ssued in corresponding EP 18156835.3.

(Continued)

*Primary Examiner* — Richard A Edgar
*Assistant Examiner* — Michael K. Reitz
(74) *Attorney, Agent, or Firm* — Scully Scott Murphy and Presser

(57) ABSTRACT

The invention refers to a connector unit formed out a side piece of a blower housing and an engine mounting plate for a drive motor of a blower, whereby the engine mounting plate is attachable to the side piece in a variety of rotational or alternatively angular positions vis-à-vis a rotational axis that runs in an axial direction to the side piece.

11 Claims, 2 Drawing Sheets

Figure 1:
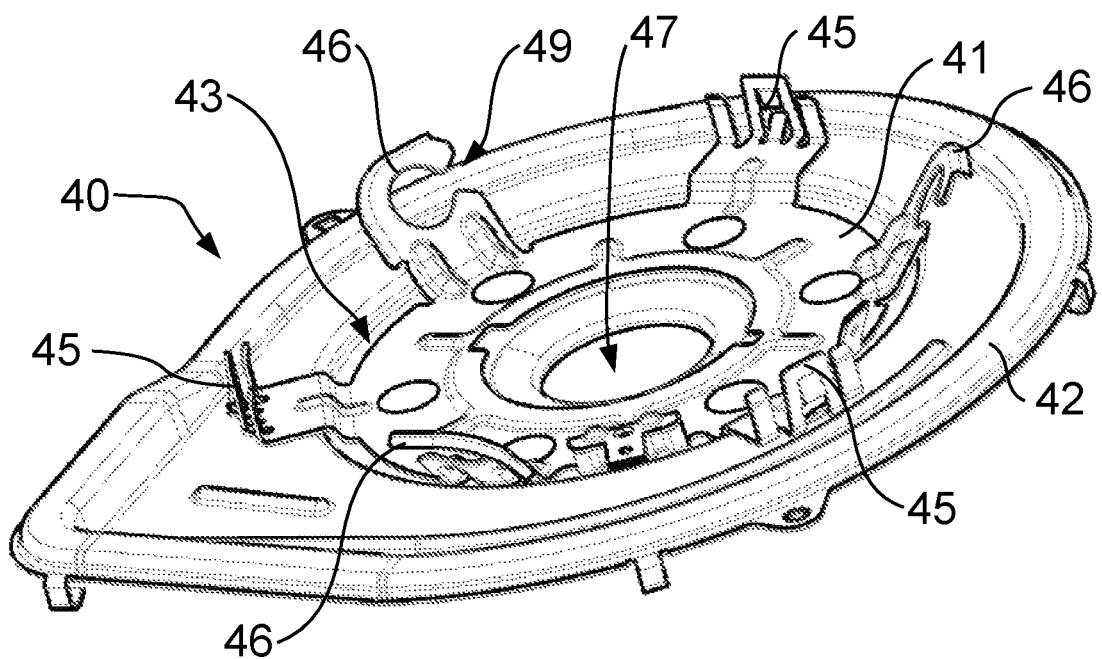

(51) Int. Cl.
*F04D 29/28* (2006.01)
*F04D 29/40* (2006.01)
*F04D 29/66* (2006.01)
*H02K 9/06* (2006.01)
*F04D 25/06* (2006.01)
*H02K 1/27* (2006.01)
*H02K 1/28* (2006.01)
*H02K 7/04* (2006.01)
*H02K 7/14* (2006.01)
*H02K 15/12* (2006.01)

(52) U.S. Cl.
CPC ............... *H02K 7/04* (2013.01); *H02K 7/14* (2013.01); *H02K 9/06* (2013.01); *H02K 15/12* (2013.01)

(56) References Cited

U.S. PATENT DOCUMENTS

| | | | |
|---|---|---|---|
| 6,024,543 A | 2/2000 | Lambertson | |
| 6,279,866 B1 | 8/2001 | Eilemann et al. | |
| 6,378,849 B1 | 4/2002 | Erdman et al. | |
| 6,897,580 B2 * | 5/2005 | White | F04D 29/668 310/51 |
| 7,251,100 B1 * | 7/2007 | Frees | G11B 19/20 360/99.08 |
| 2013/0078108 A1 | 3/2013 | McCloud et al. | |
| 2015/0219118 A1 * | 8/2015 | Zakula | F04D 29/626 415/204 |
| 2016/0053772 A1 | 2/2016 | Lofy et al. | |
| 2016/0186763 A1 * | 6/2016 | Keber | F04D 29/083 417/423.12 |
| 2016/0327063 A1 * | 11/2016 | Tejeda | F04D 25/06 |
| 2017/0370363 A1 | 12/2017 | Avedon | |

FOREIGN PATENT DOCUMENTS

| | | |
|---|---|---|
| DE | 102014224917 A1 | 6/2016 |
| EP | 1900083 A1 | 3/2008 |
| EP | 2586118 A2 | 5/2013 |
| FR | 2975143 A1 | 11/2012 |
| JP | 2016116345 A | 6/2016 |
| WO | 2011017763 A1 | 2/2011 |

OTHER PUBLICATIONS

European Office Action dated Nov. 14, 2019 received in application EP 18 156 835.3 together with an English language translation.

* cited by examiner

CONNECTOR UNIT FOR A FAN

The invention refers to a connector unit for a blower made up of a side piece of a blower housing and an engine mounting plate for a drive motor of the blower.

There are numerous variants for the assembly of blower housings. A variant that is known from the state of the art, has a blower housing that is determined by a blower housing part and a side piece, whereby the blower housing part houses the impeller and creates the pressure chamber, whereas the side piece is formed as a type of cover that axially closes the blower housing, upon which the drive motor for the blower can be attached.

In the state of the art, side pieces are made out of die-cast aluminum. Engine mounts for the attachment of the drive motor are located at set positions according to customer requirements. Given the variety of preferred installation positions for the motor with respect to the housing, the motor position on the side piece must be designed in a variable manner. To accomplish this, an ever increasing number of side piece variants are being prepared, in which the engine mounting plate is bolted depending on the desired installation position of the motor. This is however elaborate and costly.

It is against this background that the purpose of this invention is that of providing a connector unit for a blower formed out of a side piece of a blower housing and an engine mounting plate, which ensures the desired variability of the desired motor position in relation to the blower housing, without there being a need for various side pieces to accomplish this.

The purpose is achieved through the combination of features according to patent Claim 1.

According to the invention, a connector unit is suggested that is formed out of a side piece of a blower housing and an engine mounting plate for a drive motor of a blower, whereby the engine mounting plate is attachable to the side piece in a variety of rotational or alternatively angular positions vis-à-vis a rotational axis that runs in an axial direction to the side piece.

By means of the solution according to the invention, it is possible, with only one design of a side piece, to realize the various customer-specific requirements relating to the rotational positions of the engine mounting plate, and therefore of the drive motor vis-à-vis the housing.

Through the solution according to the invention, the user can infinitely rotate the motor in relationship to the housing, in such a manner that, for example, the motor connector can be positioned in an optimal position for the application. This also allows for an optimal routing of the cable to the motor.

In particular, the design of the connector unit is advantageously such that an angular rotation of the motor mounts in relationship to the side piece is infinitely variable, for the determination of the various rotational or alternatively angular positions of the engine mounting plates on the side piece. This means that every relative angle can be achieved and the side piece and the engine mounting plate, in this respect, can be determined, at will, in relation to one another. As an example, this would not be the case, if brackets, protrusions, recesses or the like were designed on the side piece or the engine mounting plate, which would allow a relative position only in determined relative angles.

The connector unit according to the invention shall also be usable for pre-mixing gas-air blowers, so that according to an advantageous embodiment, the engine mounting plate is connected with the side piece in a gas-tight manner. Gas-air blowers are installed in boilers, whereby, in this field, a special routing of the motor cable, in particular a low-vibration routing is especially important. This is ensured by the flexible configuration of the engine mounting plates and therefore of the motor in relation to the side piece.

A connection of the engine mounting plate to the side piece that is in this manner gas-tight and, in any case, cost-effective, is achieved in an embodiment example of the connector unit by means of a bonding or clinching process.

In a further development, the connector unit is characterized by the fact that the clinching process occurs by means of a push-button-like, interlocking connection of the engine mounting plates with the side piece in a cold forming process. As an example, a Tox joint is processed in this manner.

As regards the costs, it is advantageous to have the side piece of the connector unit be a sheet metal part. Since no piercing attachment means, such as screws or similar, are used, it is possible to make use of sheet metal as material.

In an embodiment of the connector unit, it is foreseen that the side piece features at least two press-mount position protrusions  for the determination of the angular position of the side pieces on the blower housing. On the blower housing part, upon which the side piece is applied, it is possible to foresee corresponding locking mechanisms for interaction with the press-mount position protrusions.

A design of the connector unit is furthermore advantageous when the side piece features an axial passage opening for the routing of a shaft, but for the rest is free of passage openings. The shaft serves the purpose of drive shaft of the drive motor and is routed from outside through the side piece into the inside of the housing. No further openings or holes, for example, for the attachment of the engine mounting plates, are needed.

In a further development of the connector unit, the side piece features an axial countersinking, in which the engine mounting plate is arranged. The axial construction is thereby more compact. Moreover, the engine mounting plate can brace itself on the side sections of the countersinking in a radial direction, in such a manner that the engine mounting plate is defined as regards the position on the side piece. Prior to the attachment of the engine mounting plate to the side piece or alternatively in the countersinking of the side piece, only the rotational or alternatively angular position between the engine mounting plate and the side piece is still set.

The engine mounting plate features at least one, however preferably at least three, motor supports which are respectively designed with spacing between one another in the circumferential direction on the engine mounting plate and which allow access to parts of the engine itself or to motor parts that enclose the motor, such as, for example, an end shield or similar, in such a manner that the motor can be directly or indirectly connected to the engine mounting plate.

A design in which each of the motor supports has an insertion opening for the accommodation of elements for the dampening of vibration is moreover advantageous. Rubber grommets, which can be snapped in, can, for example, be employed as elements for the dampening of vibration.

An embodiment of the connector unit is further foreseeable, according to which the engine mounting plate features a ring element, from which each of the motor supports integrally extends away in a radial and axial direction. The motor supports can thereby be oriented in such a manner that a projected connecting line between the motor supports and along the elements for the dampening of vibration is oriented to a center of gravity of the motor to be attached.

On top of this, it is foreseen in an embodiment that the engine mounting plate features at least one, preferably a plurality, of mounting brackets for the attachment of the protective engine cap. A noise-causing contact with the side piece can be avoided through the attachment of the engine protection cap on the engine mounting plate. Greater heat dissipation can moreover be achieved. The engine mounting plate, in an advantageous manner, therefore furthermore integrates the functions of motor support, of attachment to the side piece and of accommodation of the protective engine cap in one component.

The invention furthermore comprises a blower with a blower housing, whereby the blower features a connector unit according to the aforementioned characteristics.

Figure 2:
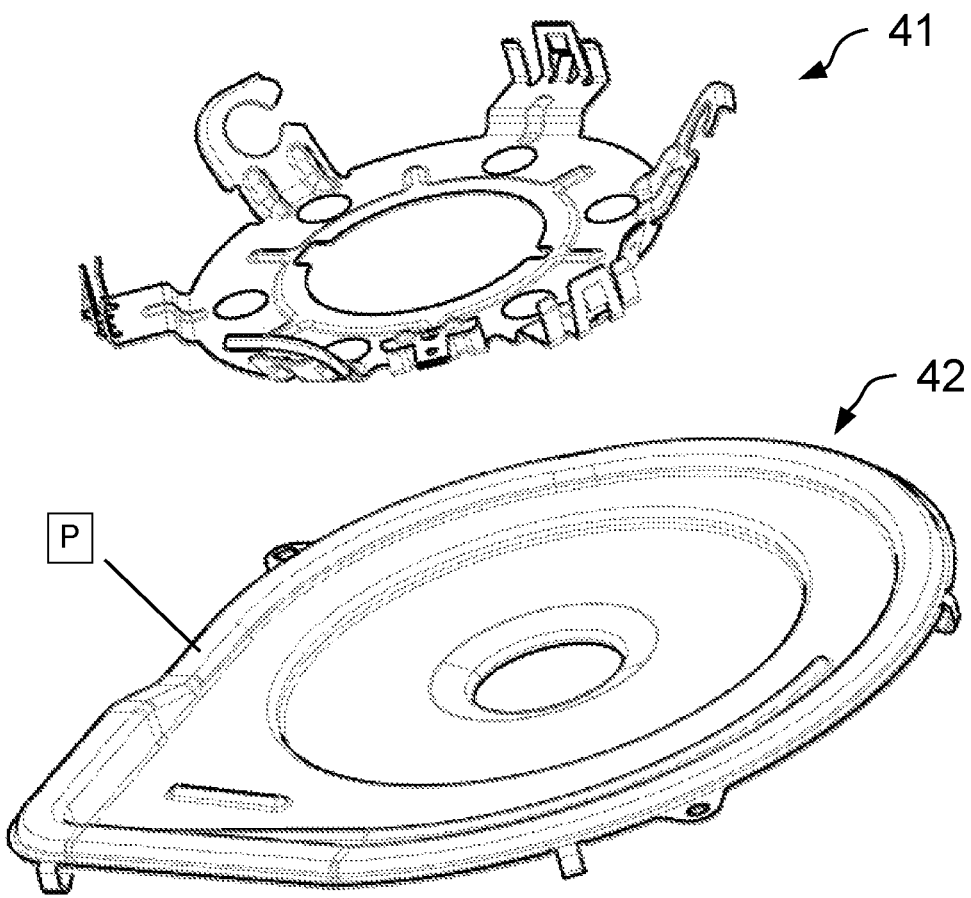
Figure 3:
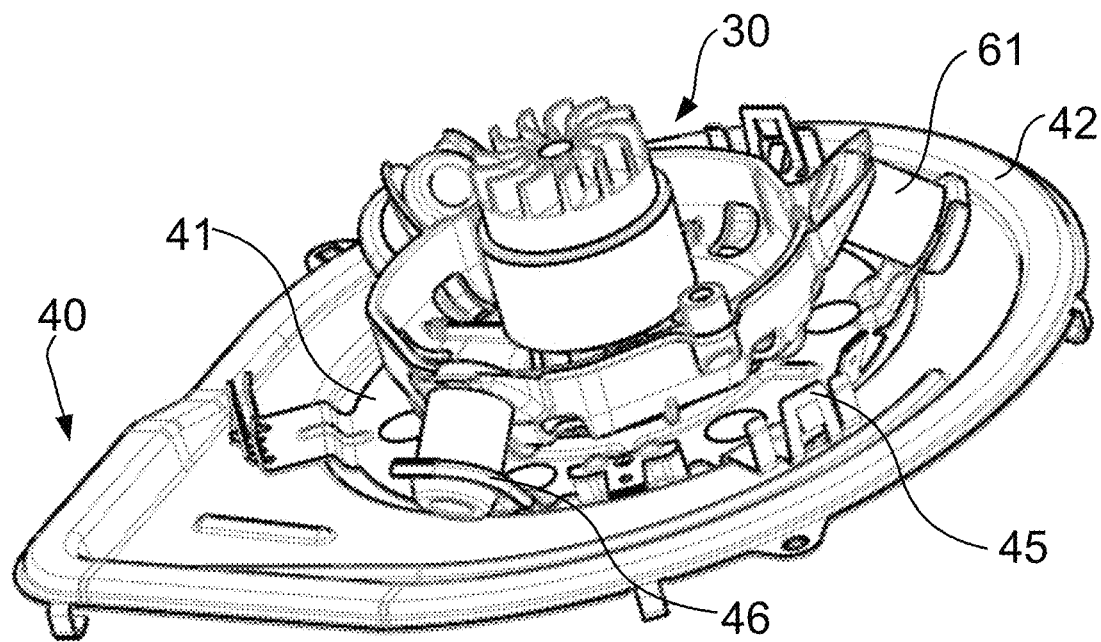
Figure 4:
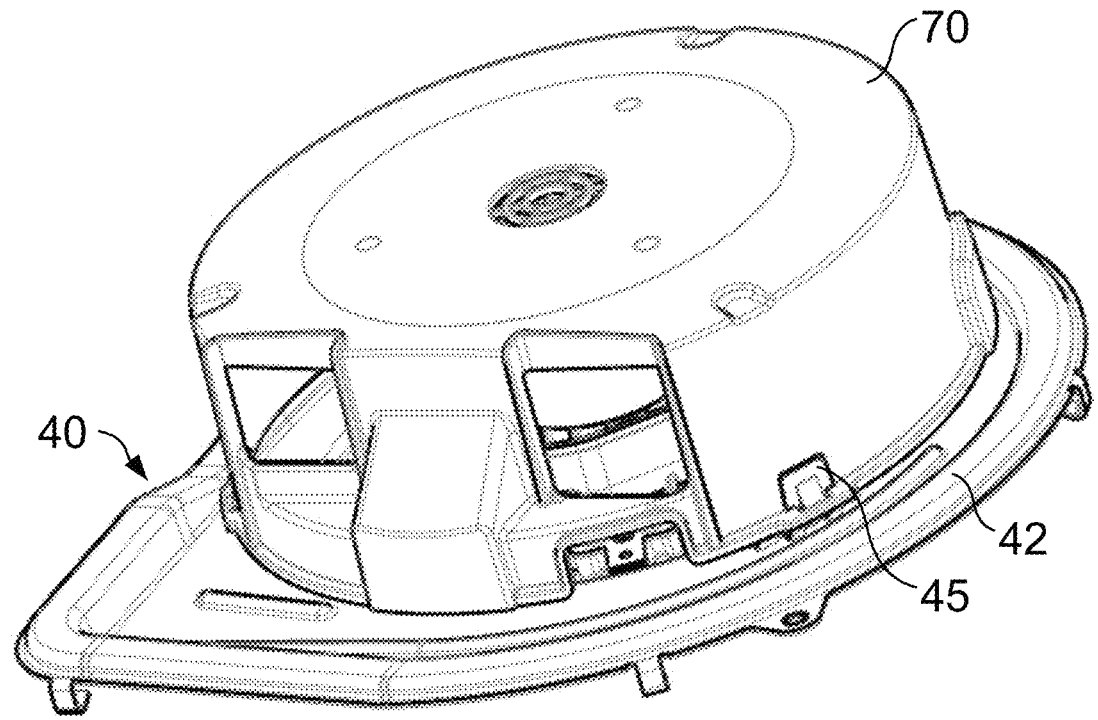

Further advantageous embodiments of the invention are hereinafter represented in more detail together with the description of the preferred embodiment of the invention on the basis of the Figures. The Figures below show:

FIG. 1 A connector unit according to the invention;

FIG. 2 The connector unit from FIG. 1 in an exploded view;

FIG. 3 The connector unit from FIGS. 1 and 2 with an incorporated rotor of a drive motor;

FIG. 4 The connector unit from FIG. 3 with an installed protective engine cap.

The characteristics that are disclosed can be combined at will as long as the same is technically possible and is not contradictory. The same reference symbols identify the same parts in all the figures.

FIGS. 1 and 2 show a connector unit 40 in a perspective and an exploded view, that is represented from the side piece 42 of the blower housing and the engine mounting plate 41 for the drive motor of a blower. The side piece 42 is a sheet metal part and is axially installed, like a housing cover, on one of the other parts of the bodies of the blower housing that forms the blower housing, in which the impeller is arranged.

The side piece 42 comprises a passage opening 47 for the routing of a drive shaft, but for the rest it is designed free of passage openings, as can be recognized in FIG. 2. The engine mounting plate 41 is attached to the side piece 42 at any rotational or alternatively angular position, on the rotational axis running opposite to the axial direction of the side piece 42, that extends axially and centrally through the passage opening 47 of the side piece 42. FIG. 2 shows the engine mounting plate 41 in the exploded view in unattached state, whereby the rotational or alternatively angular position can initially be determined at will by rotation along the rotational axis, and the engine mounting plate 41 and side piece 42 are subsequently attached to one another. In FIG. 1, the two parts are bonded to one another.

The axial countersinking 43, in which the engine mounting plate is inserted and set is designed in the side piece 42. The engine mounting plate 41 comprises a ring element with motor supports 46 and three attachment mounts 45 that are unitarily designed into it, and which extend in an axial and radial direction in an oblique manner outwards and therefore protrude axially and radially opposite the side piece 42. The axial countersinking 43 determines the position for the ring element of the engine mounting plate 41 with respect to the passage opening 47, however it does not determine the angular position, which can be selected at will.

As can be recognized in FIG. 3, the motor supports 46 each comprise a laterally open insertion opening 49 for accommodation of elements for the dampening of vibration 61 that are designed as rubber grommets. The elements for the dampening of vibration 61 are secured in the motor supports 46 with circumferential grooves on a first side, on the side that lays axially opposite, in a motor bracket with a there represented rotor 30 of the drive motors, in such a manner that the axial midline of the elements for the dampening of vibration 61 points to a focal point of the drive motor. The drive motor is maintained at a hovering distance above and axial to the side piece 42 by the engine mounting plate 41.

In reference to the FIGS. 3 and 4, it is furthermore shown that the engine mounting plate 41 features three attachment brackets 45, for the attachment of the protective engine cap 70, which completely covers the drive motor. The protective engine cap 70 is clipped into the attachment brackets 45. Due to the variable attachment position between engine mounting plate 41 and side piece 42 in the rotational direction, the complete construction made up of the engine mounting plate 41, drive motor and protective engine cap 70 is rotatable around the rotational axis, as per the required type of construction, vis-à-vis the side piece 42 and is attachable by means of the engine mounting plate 41 to the side piece 42 and therefore to the blower housing.

The invention claimed is:

1. A connector unit formed out of a side piece of a blower housing and an engine mounting plate for a drive motor of a blower, whereby the engine mounting plate is attachable to the side piece in various rotational or alternatively angular positions vis-à-vis a rotational axis that runs in an axial direction to the side piece, wherein the connector unit is formed in two pieces comprising the engine mounting plate and the side piece which are connected in a gas-tight manner, and wherein an angular rotation of the engine mounting plate with respect to the side piece for the determination of the various rotational or alternatively angular positions of the mounting plate is infinitely variable on the side piece;

wherein the engine mounting plate features at least one motor support;

wherein the engine mounting plate features a ring element, from which each of the motor supports integrally extends away in a radial and axial direction; and and wherein the motor supports each comprise a laterally insertion opening.

2. The connector unit according to claim 1, wherein the engine mounting plate is connected to the side piece by means of a bonding or clinching process.

3. The connector unit according to claim 2, wherein the clinching process occurs by means of a push-button, interlocking connection of the engine mounting plates with the side piece in a cold forming process.

4. The connector unit according to claim 1, wherein the side piece is a sheet metal piece.

5. The connector unit according claim 1, wherein the side piece features at least two press-mount position protrusions for the determination of the angular position of the side pieces on the blower housing.

6. The connector unit according to claim 1, wherein the side piece features an axial passage opening for the routing of a shaft, but that for the rest is free of passage openings.

7. The connector unit according to claim 1, wherein the side piece features an axial countersinking, in which the engine mounting plate is arranged.

8. The connector unit according to claim 1, wherein the engine mounting plate features a plurality of motor supports.

9. The connector unit according to claim 1, wherein each of the motor supports each forms an insertion opening for the accommodation of elements for the dampening of vibration.

10. The connector unit according to claim 1, wherein the engine mounting plate features at least attachment brackets for the attachment of a protective engine cap.

11. A blower with a blower housing, whereby the blower features a connector unit according to claim 1.

* * * * *